United States Patent
Virolainen et al.

(10) Patent No.: US 9,008,321 B2
(45) Date of Patent: Apr. 14, 2015

(54) AUDIO PROCESSING

(75) Inventors: Jussi Virolainen, Espoo (FI); Jussi Mutanen, Jyvaskyla (FI); Kai Samposalo, Pirkkala (FI)

(73) Assignee: Nokia Corporation, Espoo (FI)

( * ) Notice: Subject to any disclaimer, the term of this patent is extended or adjusted under 35 U.S.C. 154(b) by 576 days.

(21) Appl. No.: 13/377,139

(22) PCT Filed: Jun. 8, 2009

(86) PCT No.: PCT/EP2009/057050
§ 371 (c)(1),
(2), (4) Date: Feb. 28, 2012

(87) PCT Pub. No.: WO2010/142320
PCT Pub. Date: Dec. 16, 2010

(65) Prior Publication Data
US 2012/0170760 A1    Jul. 5, 2012

(51) Int. Cl.
*H04R 29/00* (2006.01)
*G10L 19/008* (2013.01)
*G10L 25/06* (2013.01)
*H04M 3/56* (2006.01)
*H04S 7/00* (2006.01)

(52) U.S. Cl.
CPC .............. *G10L 19/008* (2013.01); *G10L 25/06* (2013.01); *H04M 3/568* (2013.01); *H04S 7/30* (2013.01)

(58) Field of Classification Search
CPC ................................. H04R 29/00; H04R 3/00
USPC ............... 381/56, 91–92, 77, 80, 82
See application file for complete search history.

(56) References Cited

U.S. PATENT DOCUMENTS

| | | | |
|---|---|---|---|
| 4,890,065 A | 12/1989 | Laletin | |
| 6,130,949 A * | 10/2000 | Aoki et al. | 381/94.3 |
| 7,333,865 B1 * | 2/2008 | Covell et al. | 700/94 |
| 7,676,044 B2 * | 3/2010 | Sasaki et al. | 381/59 |
| 7,973,857 B2 | 7/2011 | Ahmaniemi et al. | |
| 8,218,460 B2 | 7/2012 | Laaksonen et al. | |
| 8,781,137 B1 * | 7/2014 | Goodwin | 381/94.1 |
| 2004/0098633 A1 | 5/2004 | Lienhart et al. | |
| 2007/0010649 A1 | 1/2007 | Hale et al. | |
| 2007/0106498 A1 | 5/2007 | Hard | |
| 2008/0016097 A1 | 1/2008 | Haas et al. | |
| 2008/0160977 A1 | 7/2008 | Ahmaniemi et al. | |
| 2008/0317260 A1* | 12/2008 | Short | 381/92 |

FOREIGN PATENT DOCUMENTS

WO    2007003683 A1    1/2007

OTHER PUBLICATIONS

International Search Report and Written Opinion of the International Searching Authority for PCT/EP2009/057050, dated May 12, 2010, 17 pages.
Lindsey et al., "Network Synchronization", Proceedings of IEEE vol. 73, No. 10, 1985.

* cited by examiner

*Primary Examiner* — Disler Paul
(74) *Attorney, Agent, or Firm* — Alston & Bird LLP (57) ABSTRACT

A method including: determining a time difference between at least a first audio channel and a second audio channel of the same acoustic space; and enabling a corrective time shift between the first audio channel and the second audio channel when the time difference exceeds a threshold.

19 Claims, 4 Drawing Sheets

AUDIO PROCESSING

RELATED APPLICATION

This application was originally filed as PCT Application No. PCT/EP2009/057050 filed Jun. 8, 2009.

FIELD OF THE INVENTION

Embodiments of the present invention relate to audio processing. In particular, they relate to differential processing of audio channels that share a remote acoustic space.

BACKGROUND TO THE INVENTION

An acoustic space may comprise a plurality of locations for audio capture. Audio captured at one location may also be captured at another location in the acoustic space resulting in correlated audio channels. The correlation between the audio channels should be respected if the quality of the captured audio is to be maintained when processed at a remote location.

BRIEF DESCRIPTION OF VARIOUS EMBODIMENTS OF THE INVENTION

According to various, but not necessarily all, embodiments of the invention there is provided a method comprising: determining a time difference between at least a first audio channel and a second audio channel of the same acoustic space; and enabling a corrective time shift between the first audio channel and the second audio channel when the time difference exceeds a threshold.

According to various, but not necessarily all, embodiments of the invention there is provided an apparatus comprising: means for determining a time difference between at least a first audio channel and a second audio channel of the same acoustic space; and means for enabling a corrective time shift between the first audio channel and the second audio channel when the time difference exceeds a threshold.

According to various, but not necessarily all, embodiments of the invention there is provided an apparatus comprising:

processing circuitry configured to determine a time difference between at least a first audio channel and a second audio channel of the same acoustic space;

comparison circuitry configured to compare the determined time difference with a threshold; control circuitry configured to apply a corrective time shift between the first audio channel and the second audio channel when the comparison circuitry determines that the time difference exceeds a threshold.

According to various, but not necessarily all, embodiments of the invention there is provided a system comprising the apparatus as described in one of the above embodiments and a further apparatus at the remote location, wherein the further apparatus is configured to receive the command and to perform a corrective time shift between the first audio channel and the second audio channel.

According to various, but not necessarily all, embodiments of the invention there is provided a computer program comprising machine readable instructions which when loaded into a machine enable the machine to: determine a time difference between at least a first audio channel and a second audio channel of the same acoustic space; and enable a corrective time shift between the first audio channel and the second audio channel when the time difference exceeds a threshold.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
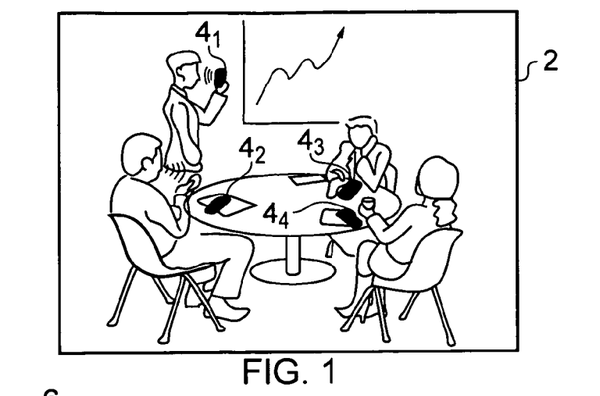
FIG. 1 schematically illustrates an acoustic space in which a plurality of users are using client apparatuses for shared audio communication.

FIG. 1 schematically illustrates an acoustic space 2 in which a plurality of users are using client apparatuses 4 for shared audio communication, which may be used for example in distributed audio conferencing. A client apparatus 4 has an audio input device 6 such as a microphone and/or an audio output device 8 such as a loudspeaker.

Figure 2:
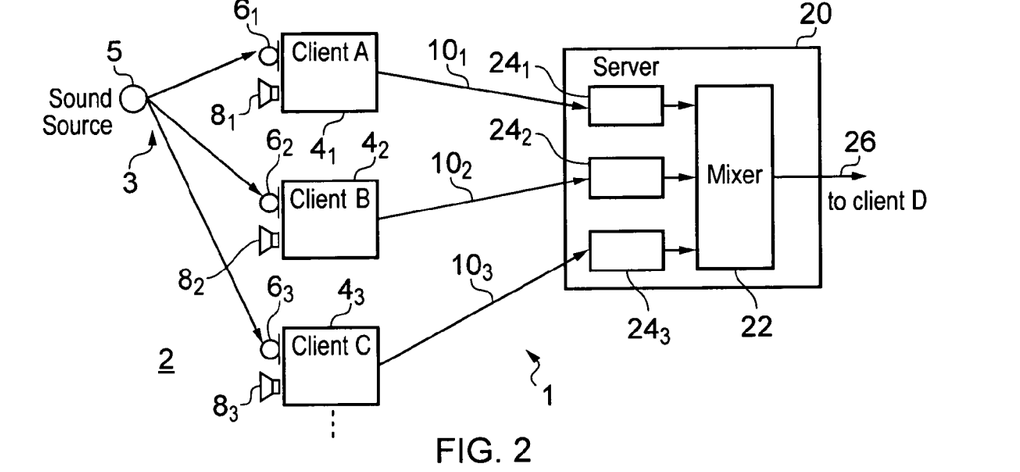
FIG. 2 schematically illustrates a system comprising a plurality of client apparatuses that share an acoustic space and a server apparatus that receives uplink communication of audio from the acoustic space.
Figure 3:
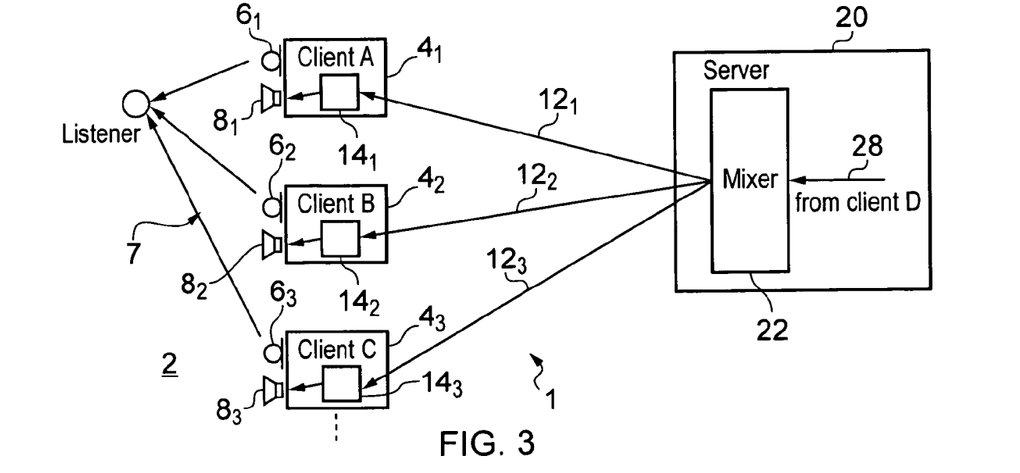
FIG. 3 schematically illustrates a system comprising a plurality of client apparatuses that share an acoustic space and a server apparatus that provides downlink communication of audio to the acoustic space.

As illustrated in FIGS. 2 and 3, the client apparatuses 4 communicate with a server 20. The server may be an integrated server that is hosted by a client apparatus or a distinct server that is physically separate from the client apparatuses 4. A distinct server may be local or remote.

An acoustic space 2 comprises a plurality of locations for audio capture wherein the characteristics of the space, the audio in the space and the locations for audio capture result in the audio input from the plurality of locations being correlated. That is the same audio is captured at different locations within an acoustic space 2.

The server 20 may provide via separate downlink audio channels 12 audio which may, for example, have been captured by another client apparatus remote from the acoustic space 2. The audio is received from the server 20 at the client apparatuses 4 which reproduce using their audio output devices 8 the audio from the remote client apparatus. There may therefore be several sources of the audio from the remote client apparatus within the acoustic space 2. The path to each different source of audio may have a different delay caused for example by different properties of the downlink audio channels 12. As a consequence the sources would without intervention produce the same audio output at different times which could result in a poor experience for a user within the acoustic space 2 as the user would hear the same audio from different locations within the acoustic space 2 but at different times. The server 20 may be configured to control compensation for the different delays in the paths to the different sources of audio in the acoustic space 2. The compensation may, for example, occur at the server 20 for downlink audio channels 12 or the compensation may occur at the client apparatuses 4.

The server 20 may receive via separate uplink audio channels 10 audio captured by the separate audio input devices 6 of the client apparatus 4 of the acoustic space 2. There may therefore apparently be several sources of the same audio from the acoustic space 2. The path from each different source of audio to the server 20 may have a different delay caused for example by different properties of the uplink audio channels 10. As a consequence the sources would without intervention provide the same audio output at different times to the server 20 for further processing and, for example, delivery to the remote client apparatus. This could result in a poor experience for a user at the remote client apparatus. The server 20 may be configured to control compensation for the different delays in the paths to the different sources of audio from the acoustic space 2. The compensation or alignment correction may, for example, occur at the server 20 for uplink audio channels 12 or the compensation may occur at the client apparatuses 4.

FIG. 3 schematically illustrates the system 1 comprising the server apparatus 20 and the plurality of client apparatuses 4 that share an acoustic space 2. This Figure illustrates the downlink communication of audio 7 from a remote client apparatus via the server apparatus 20 to the acoustic space 2.

The client apparatuses 4 comprise an audio output device 8 such as a loudspeaker. The audio 7 is broadcast by the audio output devices $8_1$, $8_2$, $8_3$ of the respective client apparatuses $4_1$, $4_2$, $4_3$ within the acoustic space 2. Each of the respective client apparatus $4_1$, $4_2$, $4_3$ receives audio data, used for creating audio 7, from the server 20 via respective downlink audio channels $12_1$, $12_2$, $12_3$. The downlink audio channels are communication channels that provide audio data. They may for example provide the audio data from the server 20 via a packet switched network which may, for example, include a cellular radio communications network, or for example via Wireless Local Area Network (WLAN) or Bluetooth.

The client apparatuses $4_1$, $4_2$, $4_3$ each comprise a respective audio downlink buffer $14_1$, $14_2$, $14_3$ associated with the respective downlink audio channel. A first audio downlink buffer $14_1$ stores the audio data received via the first downlink audio channel $12_1$. A second audio downlink buffer $14_2$ stores the audio data received via the second downlink audio channel $12_2$. A third audio downlink buffer $14_3$ stores the audio data received via the third downlink audio channel $12_3$.

FIG. 2 schematically illustrates a system 1 comprising a server apparatus 20 and a plurality of client apparatuses 4 that share an acoustic space 2. The Figure illustrates the uplink communication of audio 3 from the acoustic space 2 to the server apparatus 20.

The client apparatuses 4 comprise an audio input device 6 such as a microphone. The audio 3 from the audio source 5 is captured by the audio input devices $6_1$, $6_2$, $6_3$ of the respective client apparatuses $4_1$, $4_2$, $4_3$ within the acoustic space 2. Each of the respective client apparatus $4_1$, $4_2$, $4_3$ provide the audio captured by their audio input devices to the server 20 via respective uplink audio channels $10_1$, $10_2$, $10_3$. The uplink audio channels are communication channels that provide audio data. They may for example provide the audio data to the server 20 via a packet switched network which may, for example, include a cellular radio communications network.

The server apparatus 20 comprises a plurality of audio uplink buffers $24_1$, $24_2$, $24_3$ associated with the respective uplink audio channels. A first audio uplink buffer $24_1$ stores the audio data received via the first uplink audio channel $10_1$ before it is processed by processing circuitry 22. A second audio uplink buffer $24_2$ stores the audio data received via the second uplink audio channel $10_2$ before it is processed by processing circuitry 22. A third audio uplink buffer $24_3$ stores the audio data received via the third uplink audio channel $10_3$ before it is processed by processing circuitry 22.

The processing circuitry 22 processes the audio data received from the buffers 24 and provides as a result of the processing output audio data 26 that is transmitted to another remote client apparatus.

Figure 4:
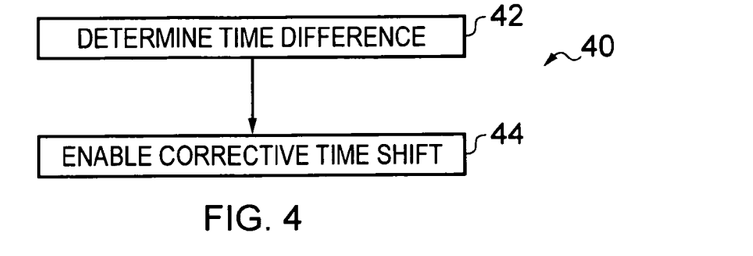
FIG. 4 schematically illustrates an alignment correction process.

FIG. 4 schematically illustrates an alignment correction process 40 which may be performed by the server 20. As illustrated in block 42, a time difference between at least a first uplink audio channel and a second audio uplink channel of the same acoustic space 2 is determined. At block 42, a corrective time shift between the first uplink audio channel and the second uplink audio channel is enabled when the time difference exceeds a threshold.

The corrective time shift may be a discrete predetermined unit of time. The corrective time shift may be achieved by introducing a segment of additional audio to an audio channel or discarding a segment of audio from an audio channel. The segment of audio may be an audio frame such as a silent frame.

Additional audio may be introduced to an audio channel by, for example, adding a segment of audio data to an audio buffer. A segment of audio may be discarded by, for example, not processing a segment of encoded audio data present in an audio buffer, in conjunction with error concealment processing or by discarding desired number of audio samples. For example cross-fading may be used to process the audio signal on either side of the added or discarded segment of audio.

The server 20 may enable application of a forward time shift to the second audio channel by adding audio data to the second audio channel when the time difference exceeds a lag threshold. The lag threshold may have a value equivalent to at least half the duration of the audio data added so that adding data reduces the magnitude of the time difference. The audio data added may be a frame, for example, a silent frame and the threshold may be half a frame duration.

The server 20 may enable application of a backward time shift to the second audio channel by discarding audio data of the second audio channel when the time difference exceeds a lead threshold. The second lead threshold has a value equivalent to at least half the duration of the audio data discarded so that adding data reduces the magnitude of the time difference. The audio data added discarded be a frame, for example, a silent frame and the threshold may be half a frame duration.

Figure 5A:
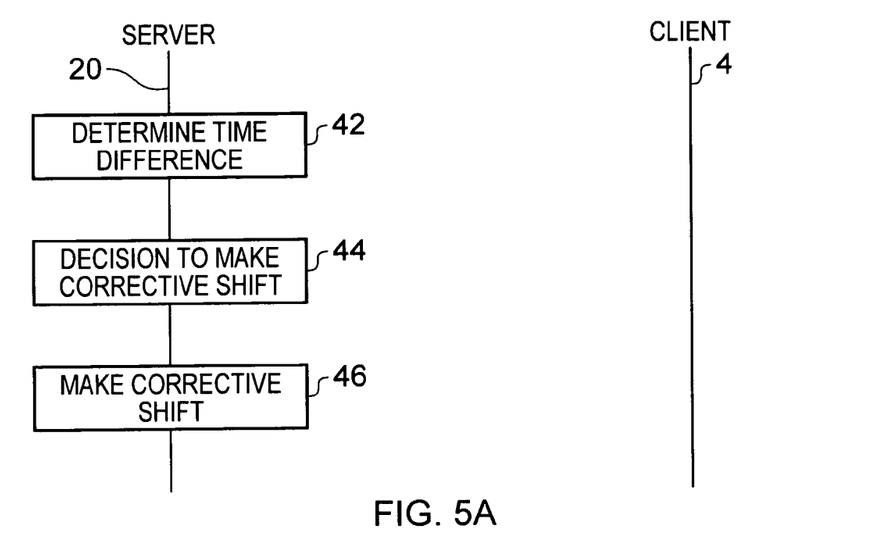
FIG. 5A schematically illustrates an alignment correction process in which the server performs the corrective shift.

As illustrated in FIG. 5A, the server 20, after determining that a corrective shift is necessary and enabling the corrective shift at block 44, can perform the corrective shift itself as illustrated by block 46. The corrective shift may, for example, be achieved by selectively adding data to or discarding data from the audio uplink buffers 24 or during processing by the processing circuitry 22. The data may be an audio frame such as a silent frame. The corrective shift is sized to reduce the time difference between the first uplink audio channel and a second audio uplink channel to below the threshold.

Although the audio uplink buffers 24 are illustrated in FIG. 2 as being located in the server apparatus 20, the purpose of the audio uplink buffers is to store the audio data before combined processing. Therefore, in other implementations the audio uplink buffers 24 may reside in the client apparatuses 4. The use of audio uplink buffers 24 in the client apparatuses 4 may be in addition to or as an alternative to using audio uplink buffers in the server apparatus 20. Referring to FIG. 5A, at block 44, the corrective time shift between the first uplink audio channel and the second uplink audio channel is enabled at remote audio uplink buffers in the client apparatuses 4 by sending a command from the server apparatus 20 to the client apparatuses 4.

Figure 5B:
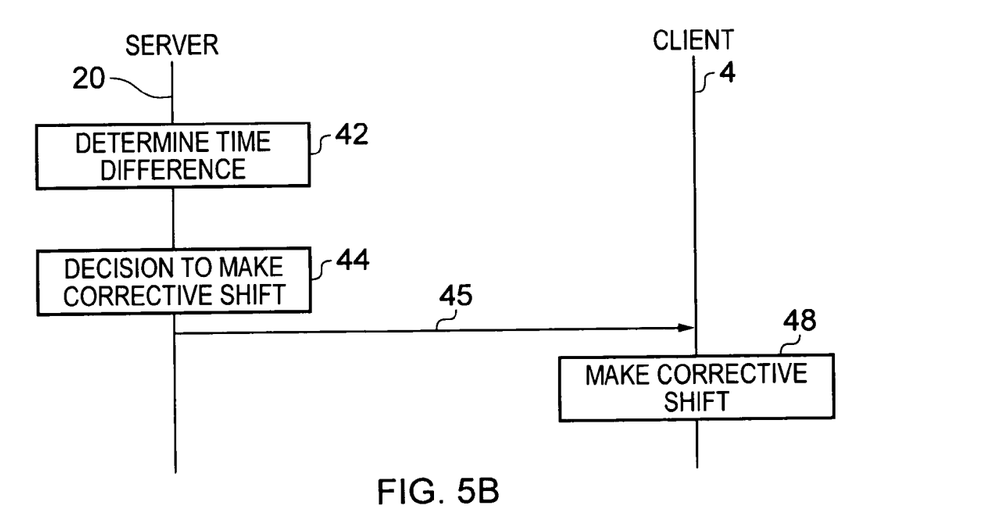
FIG. 5B schematically illustrates an alignment correction process in which the server commands a client apparatus to perform the corrective shift.

As illustrated in FIG. 5B, the server 20, after determining that a corrective shift is necessary and enabling the corrective shift at block 44, can send a command 45 to a client apparatus 4. The client apparatus 4 then makes the corrective shift itself as illustrated by block 48. The corrective shift may, for example, be achieved by selectively adding data to or discarding data from the audio downlink buffers 14 and/or uplink buffers 24 if present in the clients. The data may be an audio frame such as a silent frame. The corrective shift is sized to reduce the time difference between the first uplink audio channel and a second audio uplink channel to below the threshold.

Although the audio downlink buffers 14 are illustrated in FIG. 3 as being located in the client apparatuses 4, the purpose of the audio downlink buffers 14 is to store the audio data before rendering. Therefore, in other implementations the audio downlink buffers 14 may reside in the server apparatus 20. The use of audio downlink buffers 14 in the server apparatus 20 may be in addition to or as an alternative to using audio downlink buffers in the client apparatuses 4. Referring to FIG. 5B, at block 44, the corrective time shift between the first uplink audio channel and the second uplink audio channel may then be enabled at local audio downlink buffers 14 in the server client apparatus 20.

The time difference may be determined by correlating audio data of the first audio channel as a consequence of an event in the acoustic space 2 against audio data of the second audio channel as a consequence of the event in the acoustic space 2 to find the time difference corresponding to a maximum value of correlation function between audio signals of the first and second audio channels.

For example, a noise event in the acoustic space 2 should be captured by all the input devices 6 in the acoustic space 2 and appear as a common characteristic in the uplink audio channels 10 from the acoustic space. The characteristic may be identified in one audio channel, for example, the reference audio channel and then correlated against the remaining plurality of input audio channels 10 from the acoustic space 2 to determine the time shifts between the remaining plurality of audio channels and the reference channel. The audio may be transmitted in the input audio channel 10 as a pulse code modulated (PCM) audio signal and the characteristic identified by correlation is then a characteristic of the PCM signal. Alternatively, the audio may be encoded at the client apparatus 4 to include one or more time variable parameters. The characteristic identified by correlation may be a characteristic of such a time variable parameter. An example of a parameter is a Voice Activity Detection (VAD) decision (indicating that respective signal segment is either active or inactive speech) or a pitch lag value.

The server 20 may, in some embodiments, trigger an audio output event within the acoustic space 2 for the purpose determining the time difference. For example, it may send an audio beacon to the client apparatuses 4 of the acoustic space 2 for output in the acoustic space 2. The audio beacon may be detectable by signal processing but inaudible to a normal human.

As an example, if a first beacon were sent on a first downlink audio channel $12_1$ from the server 20 and detected at the server 20 on a first input audio channel $10_1$ at time T1 (reference channel) and a second input audio channel $10_2$ at time T2, the uplink delay between the first and second audio uplink channels may be calculated as T2-T1.

If a second beacon were sent on a second downlink audio channel $12_2$ from the server 20 and detected at the server 20 on the first input audio channel $10_1$ at time T1' and the second input audio channel $10_2$ at time T2', then the uplink delay between the first and second input audio channels is the average of T1-T2 and T1'-T2'. The downlink delay between first and second downlink audio channels may be calculated as the difference between (T2'-T2) and (T1'-T1)

FIGS. 4, 5A and 5B have been described as processes that determine a time difference between a first audio channel and a second audio channel of the same acoustic space 2. However, the first audio channel may be designated as a reference channel for the acoustic space 2. The processes of FIGS. 4, 5A and 5B may then be used to determine a time difference between the reference audio channel and a respective one of the remaining plurality of audio channels for the acoustic space 2. The processes of FIGS. 4, 5A and 5B may then be used to enable a corrective time shift of the remaining plurality of audio channels relative to the reference audio channel.

The reference audio channel may be fixed so that it is always the first audio channel. Alternatively, the reference channel may be any of the plurality of audio channels and the identity of the reference channel may vary over time. For example, the reference audio channel may be selected so that the distribution of time differences for an acoustic space are distributed fairly evenly as lags and leads about the reference audio channel. That is, the reference channel is chosen as the audio channel that suffers the median or near the median delay of the plurality of audio channels. The reference may also be defined for example as a channel that has the highest average energy in a predetermined time window or a channel that has signal-to-noise ratio (SNR) meeting predetermined criteria. As a further example, the reference channel selection logic may also take into account the reference channel selected for one or more preceding segments of audio signal in order to avoid frequently changing the reference signal.

Figure 6:
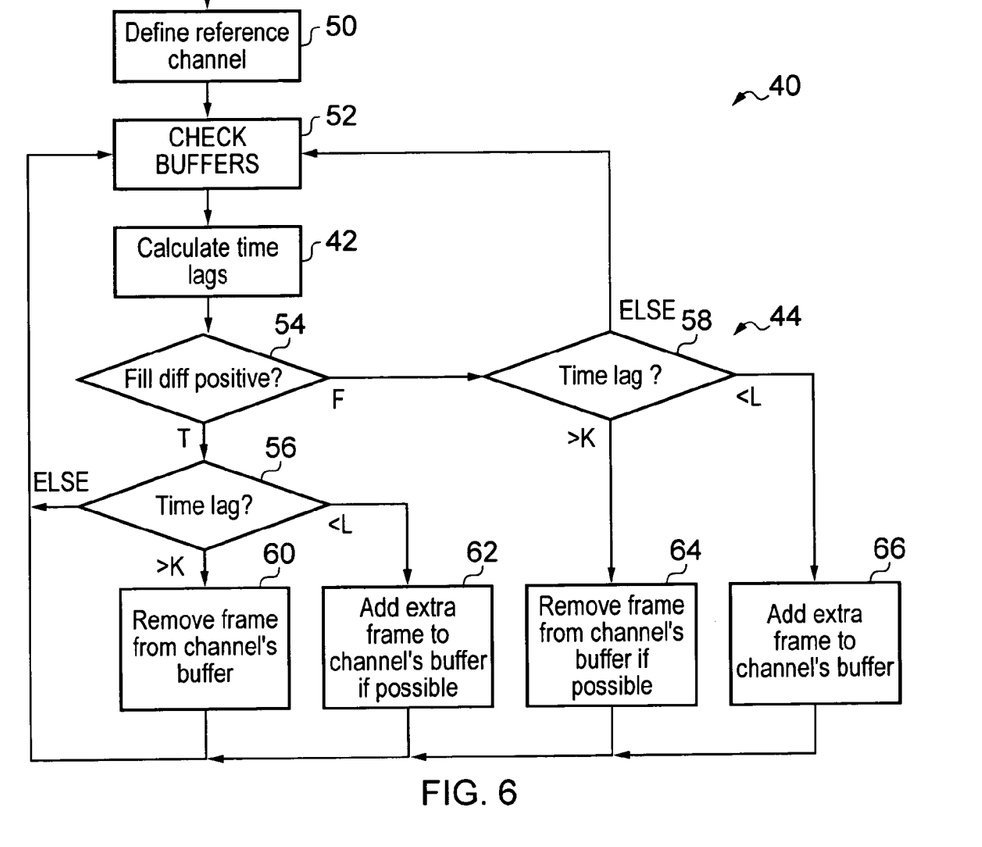
FIG. 6 schematically illustrates, an example of an alignment correction process in more detail.

Referring to FIG. 6, an example of an alignment correction process 40 is schematically illustrated in more detail.

At block 50 a reference input audio channel 10 is defined for the acoustic space 2.

At block 52 the audio uplink buffers 24 for each of the different input audio channels 10 associated with the acoustic space 2 are accessed to determine their fill rates. Fill rate is a rate of speed at which a buffer receives audio data. Alternatively or additionally, buffer fill levels indicating the duration of audio signal stored in respective buffers may be determined.

A block 42, a time difference between the reference audio channel 10, and the subject audio channel $10_s$ of the same acoustic space 2 is calculated.

The time difference calculated at block 42 indicates whether the subject audio channel $10_s$ lags or leads the reference audio channel $10_r$.

At block 54 it is determined whether the fill rate for the buffer $24_s$ associated with the subject input audio channel $10_s$ is greater or less than the fill rate for the buffer $24_r$ associated with the reference input audio channel $10_r$. Alternatively or additionally, it may be determined at block 54 whether the fill level for the buffer $24_s$ associated with the subject input audio channel $10_s$ is greater or less than the fill level for the buffer $24_r$ associated with the reference input audio channel $10_r$.

If the fill rate for the buffer $24_s$ associated with the subject input audio channel $10_s$ is greater than the fill rate for the buffer $24_r$ associated with the reference audio channel $10_r$, the process moves to block 56.

If the fill rate for the buffer $24_s$ associated with the subject input audio channel $10_s$ is less than the fill rate for the buffer $24_r$ associated with the reference audio channel $10_r$, the process moves to block 58.

Alternatively or additionally, the process at block 54 may use the evaluation of buffer fill levels buffer fill rates in order to decide on the next step. In this case, if the fill level for the buffer $24_s$ associated with the subject input audio channel $10_s$ is greater than the fill level for the buffer $24_r$ associated with the reference audio channel $10_r$, the process moves to block 56. If the fill level for the buffer $24_s$ associated with the subject input audio channel $10_s$ is less than the fill level for the buffer $24_r$ associated with the reference audio channel $10_r$, the process moves to block 58.

At block 56, when the time difference between subject audio channel $10_s$ and the reference audio channel $10_r$, exceeds a lead threshold (time difference >K), a backward time shift is applied to the subject audio channel $10_s$ at block 60 by discarding audio data from the audio uplink buffer $24_s$ of the subject audio channel $10_s$.

The lead threshold has a value equivalent to at least half the duration of the audio data discarded so that removing data reduces the magnitude of the time difference. The audio data discarded may be a frame, for example, a silent frame and the threshold may be half a frame duration.

At block 56, when the time difference between the reference audio channel 10, and the subject audio channel $10_s$ exceeds a lag threshold (time difference <L), a forward time shift is applied to the subject audio channel $10_s$ at block 62 by adding audio data to the audio uplink buffer $24_s$ of the subject audio channel if there is sufficient room in the audio uplink buffer $24_s$ associated with the subject audio channel $10_s$.

If there is insufficient room, a flag may be set for that buffer $24_s$. The forward time shift is then delayed until there is sufficient room in the audio uplink buffer $24_s$ for the extra audio data to be added.

The lag threshold (L) may have a value equivalent to at least half the duration of the audio data added so that adding data reduces the magnitude of the time difference. The audio data added may be a frame, for example, a silent frame, a copy of a preceding or a following frame, or a frame derived based on at least one preceding frame and/or at least one following frame, and the threshold may be half a frame duration.

At block 58, when the time difference between the reference audio channel 10, and the subject audio channel $10_s$ exceeds a lead threshold (time difference >K2), a backward time shift is applied to the subject audio channel at block 64 by discarding audio data from the audio uplink buffer $24_s$ of the subject audio channel $10_s$ if there is sufficient data in the audio uplink buffer $24_s$.

If there is insufficient data, a flag may be set for that buffer. The backward time shift is then delayed until there is sufficient data in the audio uplink buffer $24_s$ for the audio data to be discarded.

The lead threshold (K2) has a value equivalent to at least half the duration of the audio data discarded so that removing data reduces the magnitude of the time difference. The audio data discarded may be a frame, for example, a silent frame, a copy of a preceding or a following frame, or a frame derived based on at least one preceding frame and/or at least one following frame, and the threshold may be half a frame duration.

At block 58, when the time difference between the reference audio channel $10_r$ and the subject audio channel $10_s$ exceeds a lag threshold (time difference<L2), a forward time shift is applied to the subject audio channel $10_s$ at block 66 by adding audio data to the audio uplink buffer $24_s$ of the subject audio channel $10_s$.

The lag threshold (L2) may have a value equivalent to at least half the duration of the audio data added so that adding data reduces the magnitude of the time difference. The audio data added may be a frame, for example, a silent frame, a copy of a preceding or a following frame, or a frame derived based on at least one preceding frame and/or at least one following frame, and the threshold may be half a frame duration.

In the process 40, after decisions at blocks 56 or 58, data is added to the subject audio uplink buffer $24_s$ at block 62 or 66 and removed from the subject audio uplink buffer $24_s$ at block 60 or 64.

The addition of data to a buffer or the removal of data from a buffer may be delayed until a predetermined condition is satisfied. Once such condition already mentioned is the availability of data for removal and the availability of space in the buffer for the addition of data. An alternative or additional condition, may relate to audio quality. That is audio data is added or removed at moments when there is less impact on the quality of the audio. For example, audio data may be added or removed during silence or unvoiced speech, or a data segment substantially corresponding to current pitch lag (i.e. pitch cycle length) may be removed or repeated.

The method 40 may also be augmented by enabling suppression of the subject audio channel when the time difference between the reference audio channel and the subject audio channel exceeds a suppression threshold. The suppression threshold may be a size that indicates that alignment correction by forward or backward shifting the subject audio channel is not possible, which may happen for example when audio buffer size is small compared to the time difference between the channels. When the time difference exceeds the suppression threshold or thresholds (as there may be different thresholds for lag and lead) the subject audio channel is suppressed. This may, for example, be achieved by setting the gain for that channel at or close to zero so that no data is used for that channel.

When two signals are mixed that are recorded from same acoustic space (the signals are correlated), the time difference between the signals has significant effect on the perceived quality of the mixed signal. The listener may perceive the delayed version of the signal as an echo. Echo disturbance increases when the delay increases and when the level of the delayed signal increases. Time difference dependent level correction for the signals may be applied before they are mixed to preserve signal quality in cases when the delay cannot be compensated. When the delay increases, the delayed signal is attenuated more to preserve the quality of the mixed signal. Note that in this approach, suppression of a signal may take place if the time difference is large enough to cause the attenuation to be increased to a level that substantially corresponds to suppression of a signal. As an example, a set of one or more predetermined thresholds may be used together with a respective set of attenuation factors, and when the time difference exceeds a first threshold (but does not exceed a second threshold having the closest value to that of the first threshold among the set of thresholds), the respective attenuation factor is selected.

In special cases e.g. when reference signal selection is based on the temporal average energy of the signals, it is possible that the signal with the lag (delay) is selected as a reference. Thus, the other signal(s) may lead the reference signal. In this case delay (lead) dependent attenuation can be applied to the leading signals as well. This kind of pre-echo needs to be attenuated more than the corresponding post-echo with same delay to achieve same mixed signal quality.

The delay dependent attenuation may be adapted according to acoustics of the environment where the signals are recorded. When the acoustics is dry the delay may be more disturbing requiring more attenuation than when the acoustics are more echoic when same delay might not be perceived as disturbing.

Figure 7:
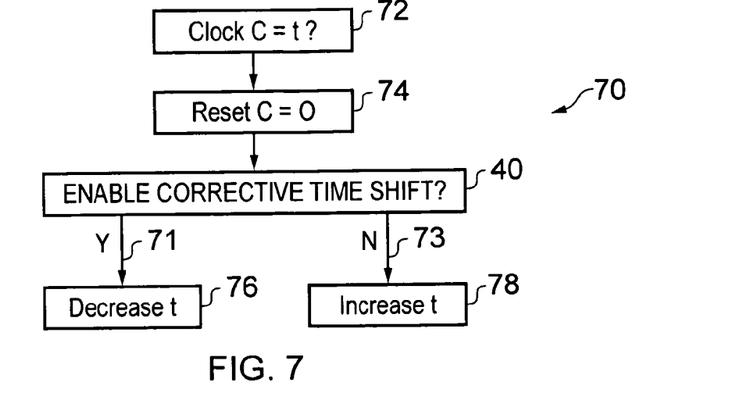
FIG. 7 schematically illustrates a method for controlling the alignment correction process.

FIG. 7 schematically illustrates a method for controlling the alignment correction process 40 when there are a plurality N of subject audio channels. In this situation, the alignment correction process 40 should be carried out for the N−1 subject audio channels using the same reference audio channel $10_r$.

At block 72, a free-running clock or timer is compared against a trigger value t. If the clock has reached the trigger value, the process moves to block 74. At block 74 the clock is re-set to zero and then the process moves onto the alignment correction process 40.

If the alignment correction process 40 performs a correction 71 the process moves to block 76 where the trigger t is decreased or reset.

If the alignment correction process 40 does not perform a correction 73 the process moves to block 76 where the trigger t is increased.

This process 70 ensures that the alignment correction process occurs intermittently over a continuous period. The intermission period controlled by the threshold t may vary. It may for example be initially 5 seconds but may decrease to, for example, 0.5 seconds or increase to 60 seconds. The process 70 is designed to adapt the threshold t so that it decreases whenever alignment correction of the channels is more likely to be necessary and increases whenever alignment correction of the channels is less likely to be necessary.

It may be desirable to have the alignment correction process 40 for each of the N−1 subject channels in the acoustic space, carried out at different times to reduce processing load.

Figure 8:
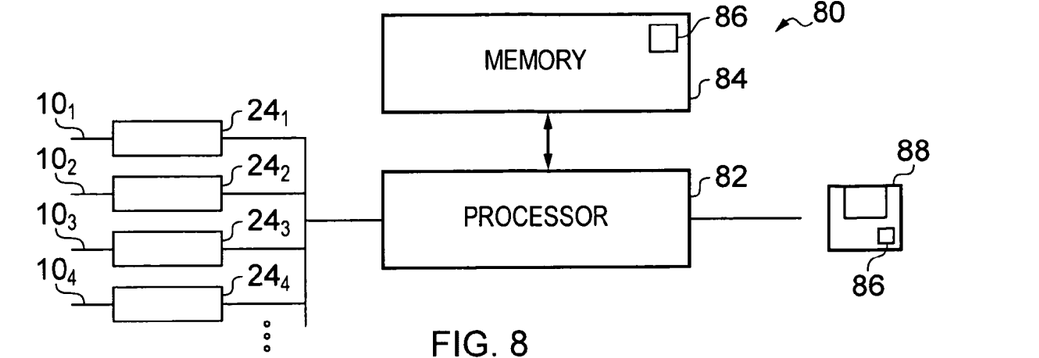
FIG. 8 schematically illustrates an apparatus suitable for performing the alignment correction process.

FIG. 8 schematically illustrates an apparatus 80 suitable for performing the alignment correction process 40. In this example, the apparatus 80 is a server apparatus 20. In other implementations it may be a module for a server 20. As used here 'module' refers to a unit or apparatus that excludes certain parts/components that would be added by an end manufacturer or a user.

Implementation of the apparatus 80 may be in hardware alone (a circuit, a processor . . . ), have certain aspects in software including firmware alone or can be a combination of hardware and software (including firmware).

The apparatus 80 may be implemented using instructions that enable hardware functionality, for example, by using executable computer program instructions in a general-purpose or special-purpose processor that may be stored on a computer readable storage medium (disk, memory etc) to be executed by such a processor.

In the Fig, the apparatus 80 comprises a plurality of audio uplink buffers 24 each of which is associated with an input audio channel 10, a processor 82 and a memory 84. The buffers 24 may be implemented using memory 84. The components are operationally coupled and any number or combination of intervening elements can exist (including no intervening elements)

The processor 82 is configured to read from and write to the memory 84. The processor 82 may also comprise an output interface via which data and/or commands are output by the processor and an input interface via which data and/or commands are input to the processor 82.

The memory 84 stores a computer program 86 comprising computer program instructions that control the operation of the apparatus 80 when loaded into the processor 82. The computer program instructions 86 provide the logic and routines that enables the apparatus 80 to perform the methods illustrated in FIGS. 4 to 7. The processor 82 by reading the memory 84 is able to load and execute the computer program 86.

The computer program instructions provide: computer readable program means for determining a time difference between at least a first audio channel and a second audio channel of the same acoustic space; and computer readable program means for enabling a corrective time shift between the first audio channel and the second audio channel when the time difference exceeds a threshold.

The computer program may arrive at the apparatus 80 via any suitable delivery mechanism 88. The delivery mechanism 88 may be, for example, a computer-readable storage medium, a computer program product, a memory device, a record medium such as a CD-ROM or DVD, an article of manufacture that tangibly embodies the computer program 86. The delivery mechanism may be a signal configured to reliably transfer the computer program 86. The apparatus 80 may propagate or transmit the computer program 86 as a computer data signal.

Although the memory 84 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 9:
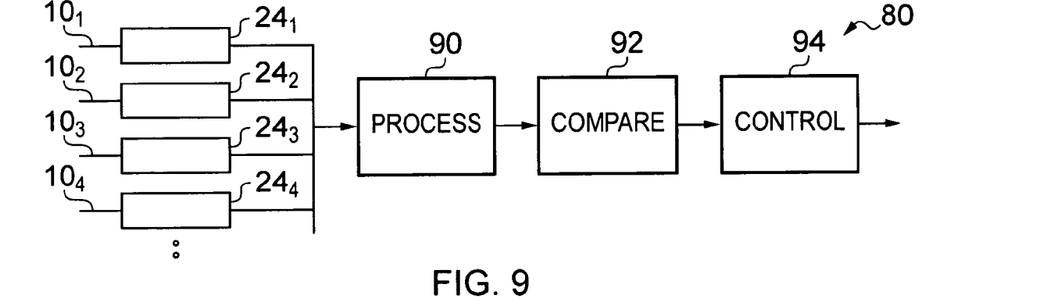
FIG. 9 schematically illustrates functional components of the apparatus.

FIG. 9 schematically illustrates functional components of the apparatus 80. The functional components include the audio uplink buffers, processing circuitry 90 configured to determine a time difference between at least a first audio channel and a second audio channel of the same acoustic space; comparison circuitry 92 configured to compare the determined time difference with a threshold; control circuitry 94 configured to apply a corrective time shift between the first audio channel and the second audio channel when the comparison circuitry determines that the time difference exceeds a threshold.

The apparatus 80 may perform some or all of the methods illustrated in FIGS. 4 to 7.

Figure 10:
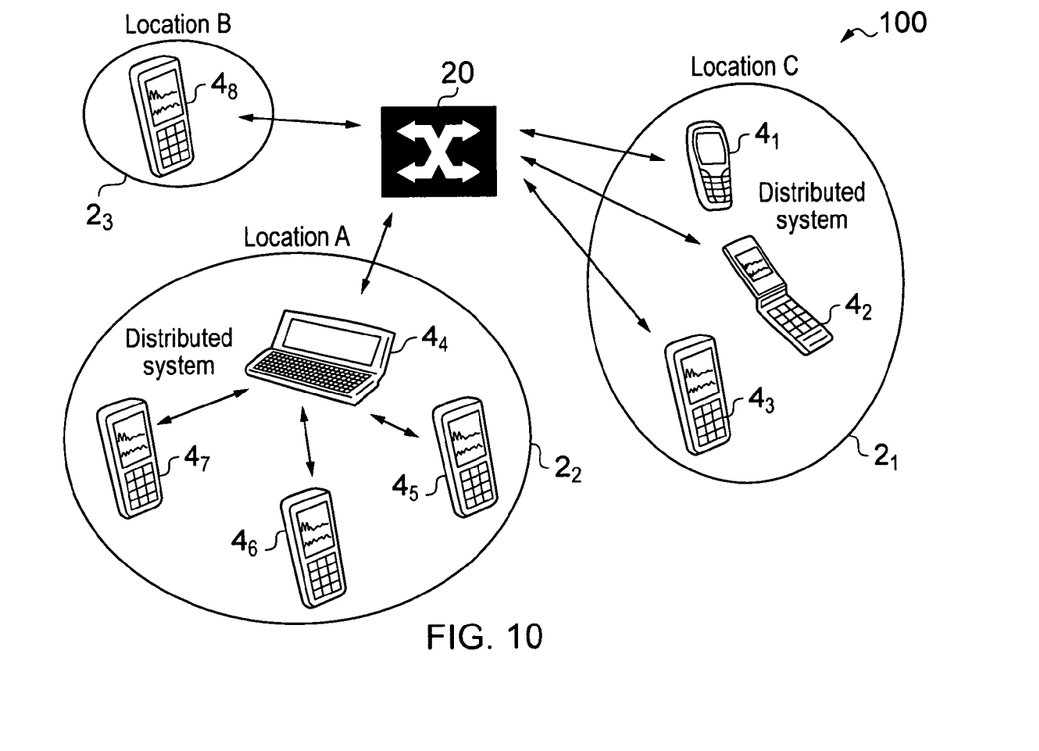
FIG. 10 schematically illustrates a system comprising a server serving client apparatuses in distinct remote acoustic spaces.

FIG. 10 schematically illustrates a system 100 comprising a server 20 serving client apparatuses 4 in three distinct acoustic spaces 2.

The first acoustic space $2_1$ is remote from the server 20 and comprises three distinct client apparatuses $4_1$, $4_2$, $4_3$. The client apparatuses $4_1$, $4_2$, $4_3$ have audio input devices and audio output devices defining audio channels for the first acoustic space $2_1$. The client apparatuses $4_1$, $4_2$, $4_3$ form a distributed system in which each client apparatus $4_1$, $4_2$, $4_3$ separately connects to the server 20.

The second acoustic space $2_2$ is remote from the server 20 and the first acoustic space $2_1$ and comprises four distinct client apparatuses $4_4$, $4_5$, $4_6$, $4_7$. The client apparatuses $4_4$, $4_5$, $4_6$, $4_7$ have audio input devices and audio output devices defining audio channels for the second acoustic space $2_2$. The client apparatus $4_4$, $4_5$, $4_6$, $4_7$ form a distributed system in which one of the client devices $4_4$ is Master and the other client apparatuses $4_5$, $4_6$, $4_7$ are Slaves. The Slaves $4_5$, $4_6$, $4_7$ communicate with the Master $4_4$ and the Master $4_4$ communicates with the server 20. Master $4_4$ may perform alignment correction for Slaves $4_5$, $4_6$ and $4_7$. Alternatively, if Master $4_4$ does not mix signals (works as a concentrator) from clients ($4_5$ $4_6$, $4_7$) it may just forward these signals to server 20, which may perform alignment correction to these signals.

The server 20 may perform the alignment correction process 40 for the audio channels associated with the first acoustic space and/or perform the alignment correction process 40 for the audio channels associated with the second acoustic space.

The blocks illustrated in the FIGS. 4 to 7 may represent steps in a method and/or sections of code in the computer program 86. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   determining a time difference between at least a first audio channel and a second audio channel of the same acoustic space wherein the time difference is determined by correlating audio data of the first audio channel as a consequence of an event in the acoustic space against audio data of the second audio channel as a consequence of the event in the acoustic space; and
   enabling a corrective time shift between the first audio channel and the second audio channel when the time difference exceeds a threshold, wherein the corrective time shift comprises introducing or discarding a segment of audio from the first audio channel or the second audio channel.

2. A method according to claim 1 wherein the audio data comprises an audio signal or a parameter of an encoded audio signal.

3. A method according to claim 2, wherein the event is a triggered audio output event within the acoustic space for the purpose determining the time difference.

4. A method according to claim 1, wherein the determining of a time difference between at least a first audio channel and a second audio channel of the same acoustic space occurs intermittently every first period of time.

5. A method according to claim 1, comprising determining a time difference between audio channels other than the first audio channel and the second audio channel at a time different to that when the time difference between the first audio channel and the second audio channel is determined.

6. A method according to claim 1, wherein the corrective time shift introduces a segment of additional audio to an audio channel or discards a segment of audio from an audio channel.

7. A method according to claim 6, wherein a segment of additional audio is introduced to an audio channel by adding a segment of audio data to an audio data buffer.

8. A method according to claim 1, wherein enabling the corrective time shift involves setting a flag that delays implementing the corrective time shift until an additional predetermined condition is satisfied.

9. A method according to claim 1, wherein the time difference indicates whether the second audio channel lags or leads the first audio channel, the method comprising:
   enabling application of a forward time shift to the second audio channel by adding audio data to the second audio channel when the time difference exceeds a first lag threshold; and
   enabling application of a backward time shift to the second audio channel by discarding audio data of the second audio channel when the time difference exceeds a first lead threshold.

10. A method according to claim 9, wherein the first lag threshold has a value equivalent to at least half the duration of the audio data added and wherein the first lead threshold has a value equivalent to at least half the duration of the audio data discarded.

11. An apparatus comprising at least one processor and at least one memory including computer program code, the at least one memory and the computer program code configured to, with the processor, cause the apparatus to at least:
   determine a time difference between at least a first audio channel and a second audio channel of the same acoustic space wherein the processing circuitry correlates audio data of the first audio channel against audio data of the second audio channel;
   compare the determined time difference with a threshold; and
   apply a corrective time shift between the first audio channel and the second audio channel when the time difference is determined to exceed a threshold, wherein the corrective time shift comprises introducing or discarding a segment of audio from the first audio channel or the second audio channel.

12. An apparatus according to claim 11, wherein the at least one memory and the computer program code are further configured to, with the processor, cause the apparatus to:
   determine a time difference between at least a first audio channel and a second audio channel of the same acoustic space intermittently every first period of time.

13. An apparatus according to claim 12, wherein the first period of time is adaptive.

14. An apparatus according to claim 11, wherein the corrective time shift introduces a segment of additional audio to an audio channel or discards a segment of audio from an audio channel.

15. An apparatus according to claim 14, comprising an audio data buffer, wherein the at least one memory and the computer program code are further configured to, with the processor, cause the apparatus to:
add a segment of additional audio to the audio data buffer.

16. An apparatus according to claim 14, comprising an audio data buffer, wherein the at least one memory and the computer program code are further configured to, with the processor, cause the apparatus to:
discard a segment of additional audio in the audio data buffer.

17. An apparatus according to claim 11, wherein the at least one memory and the computer program code are further configured to, with the processor, cause the apparatus to:
perform a corrective time shift between the first audio channel and the second audio channel when the time difference exceeds a threshold.

18. An apparatus according to claim 11, wherein the at least one memory and the computer program code are further configured to, with the processor, cause the apparatus to:
transmit a command to force, at a remote location, a corrective time shift between the first audio channel and the second audio channel.

19. A computer program product comprising at least one non-transitory computer readable medium having computer-executable program code portions stored therein, the computer-executable program code portions comprising program code instructions configured to:
determine a time difference between at least a first audio channel and a second audio channel of the same acoustic space wherein the time difference is determined by correlating audio data of the first audio channel as a consequence of an event in the acoustic space against audio data of the second audio channel as a consequence of the event in the acoustic space; and
enable a corrective time shift between the first audio channel and the second audio channel when the time difference exceeds a threshold, wherein the corrective time shift comprises introducing or discarding a segment of audio from the first audio channel or the second audio channel.

* * * * *